United States Patent
Dieckmann (12)

(10) Patent No.: US 6,427,111 B1
(45) Date of Patent: Jul. 30, 2002

(54) PROCESS FOR AUTOMATIC REGULATION OF THE DISTANCE TO A VEHICLE

(75) Inventor: Thomas Dieckmann, Pattensen (DE)

(73) Assignee: Wabco GmbH & Co. OHG, Hannover (DE)

( * ) Notice: Subject to any disclaimer, the term of this patent is extended or adjusted under 35 U.S.C. 154(b) by 96 days.

(21) Appl. No.: 09/692,705

(22) Filed: Oct. 19, 2000

(30) Foreign Application Priority Data

Oct. 26, 1999 (DE) .......................................... 199 51 423

(51) Int. Cl.[7] .............................................. B60K 31/04
(52) U.S. Cl. ......................... 701/96; 701/301; 342/455; 340/903; 180/179
(58) Field of Search .............................. 701/70, 93, 96, 701/301; 180/170, 176, 177, 169; 340/903, 435, 436; 342/454, 455

(56) References Cited

U.S. PATENT DOCUMENTS

| | | | |
|---|---|---|---|
| 6,044,321 A | * | 3/2000 | Nakamura et al. ............. 701/96 |
| 6,067,031 A | * | 5/2000 | Janky et al. ................. 340/903 |
| 6,094,616 A | | 7/2000 | Andreas et al. ............... 701/96 |
| 6,233,515 B1 | * | 5/2001 | Engelman et al. .......... 180/179 |
| 6,268,804 B1 | * | 7/2001 | Janky et al. ................. 340/903 |
| 6,304,808 B1 | * | 10/2001 | Milot .......................... 701/96 |

FOREIGN PATENT DOCUMENTS

| DE | 4437678 | 5/1996 |
|---|---|---|
| DE | 197 44 112 C | 10/1998 |
| DE | 19738690 | 3/1999 |
| DE | 19804944 | 8/1999 |
| DE | 19813912 | 9/1999 |

OTHER PUBLICATIONS

"Intelligent Driving Support: The Distance Controlled Cruise Control," E. Hipp et al., *International Traffic System*, Bd. 49, Nr. 7/08, Jul. 1, 1997, pp. 403–407.

\* cited by examiner

*Primary Examiner*—Gary Chin
(74) *Attorney, Agent, or Firm*—Proskauer Rose LLP

(57) ABSTRACT

A process for the automatic regulation of the distance between a vehicle to be regulated and another vehicle is employed in a vehicle which has a distance regulating device and a braking system which is actuable by the distance regulating device. When the distance regulating device emits a brake actuation signal to the braking system, a brake control device actuates the brakes thereby regulating the distance between the vehicle to be regulated and the other vehicle. Prior to emitting the brake actuation signal, the distance regulating device emits a braking readiness signal to the braking system thereby causing the braking system to assume a braking readiness state. The distance regulating device emits the braking readiness signal when it detects, based on the travel and road conditions surrounding the vehicle to be regulated, that braking will occur shortly. Once the braking system is in the braking readiness state, it takes less time than usual for the brakes to actuate after the distance regulating device emits a brake actuation signal.

6 Claims, 4 Drawing Sheets

PROCESS FOR AUTOMATIC REGULATION OF THE DISTANCE TO A VEHICLE

BACKGROUND OF THE INVENTION

The invention relates to a process for the automatic regulation of the distance between a vehicle being regulated and another vehicle.

A process of this type is known from DE 44 37 678 A1 (incorporated herein by reference).

In the known process for the automatic regulation of distances, a distance-regulating device is provided in a vehicle which adjusts the distance to a preceding vehicle according to predetermined algorithms by automatically changing the speed of the vehicle to be regulated. The speed can be changed by the distance regulating device emitting actuating signals to the braking system or to the engine controls of the vehicle being regulated.

For distance regulation, the highest possible degree of regulation quality is desired, as in fact for all controls. This is understood to be the quickest possible compensation for regulating deviations with minimal overshooting.

It is therefore the object of the present invention to provide a process for automatic regulation of the distance between a vehicle being regulated and another vehicle by means of which a regulation quality that is an improvement over known processes can be attained through simple means.

SUMMARY OF THE INVENTION

In accordance with the present invention, a process is disclosed for the automatic regulation of the distance between a vehicle to be regulated and another vehicle. The vehicle to be regulated has a distance regulating device and a braking system which is actuable by the distance regulating device when the distance regulating device emits a brake actuation signal to the braking system. The inventive process comprises, prior to emitting the brake actuation signal, the distance regulating device emits a braking readiness signal to the braking system thereby causing the braking system to assume a braking readiness state. Once the braking system is in the braking readiness state, it takes less time than usual for the brakes to actuate after the distance regulating device emits a brake actuation signal.

It is an advantage of the invention that the effect of response lags of mechanical transmission elements in the braking system on the distance regulation are minimized. Thus, for example, the response lag of braking systems of conventional design, e.g., friction brakes, occurs due to the fact that when the brakes are actuated, the brake cylinders must first overcome a dead distance, also called venting clearance. Within the range of this dead distance, the vehicle is not braked. By using the present invention, a higher degree of regulation quality can be achieved than has previously been possible.

The invention has the further advantage that it is very economical because it can be realized through a simple adaptation of the control programs of the known distance regulating device and brake control system. Expensive optimization of the mechanical transmission elements of the engine controls or of the braking system in order to decrease dead times is not required.

It is another advantage of the invention that the regulation amplitudes, i.e., the magnitude of the changes in speed due to the actuation of the distance-regulating device, are reduced so that the regulating behavior is smoother, thus increasing traveling comfort. The reduction of the regulating amplitudes also results in a reduction of fuel consumption. In addition, the so-called "column stability" of vehicles is considerably improved when the process according to the invention is used. Column stability in this context is understood to be the avoidance of surges in distance between a plurality of vehicles whose intervals are regulated automatically and which are traveling in a column.

In an advantageous further development of the invention, the distance-regulating device transmits the braking readiness signal to the braking system at a time when braking can be expected to occur shortly based on the "surrounding conditions." Among the surrounding conditions which may trigger the braking readiness signal, the following are mentioned:

A vehicle in an adjoining traveling lane tends to encroach upon the travel lane of the vehicle to be regulated.

One or several vehicles in the adjoining lane to the left are decelerating or traveling at a lower speed than the vehicle to be regulated.

A preceding vehicle in the same lane decelerates slightly, so that an adaptation of the distance to the vehicle to be regulated is possible by reducing its engine performance without brake actuation.

A vehicle traveling in front of the preceding vehicle in the same lane decelerates.

A road condition ahead indicates that braking will be necessary, e.g., the vehicle to be regulated approaches a relatively tight curve in the road or a highway exit ramp. The road condition ahead can be determined here by using a road-map provided in a digital form, together with a device to determine vehicle coordinates, e.g., a GPS receiver (GPS=Global Positioning System).

In general, "surrounding conditions where braking can be expected to occur shortly" is understood to be any traffic situation familiar to an experienced driver in which; he will be increasingly prepared to brake, such as in one or all of the above-mentioned cases or other situations.

Situations of the above-mentioned kind can also be recognized through an evaluation of optical signals, e.g., by means of an image recording device located in the vehicle to be regulated. Thus, a lane change by a vehicle in an adjoining lane can be recognized when its turn signal is actuated. A deceleration by a preceding vehicle can be recognized by detecting the brake light.

BRIEF DESCRIPTION OF THE DRAWINGS

The invention is explained in greater detail below with reference to the drawings wherein.

DETAILED DESCRIPTION OF PREFERRED EMBODIMENTS OF THE INVENTION

Figure 1:
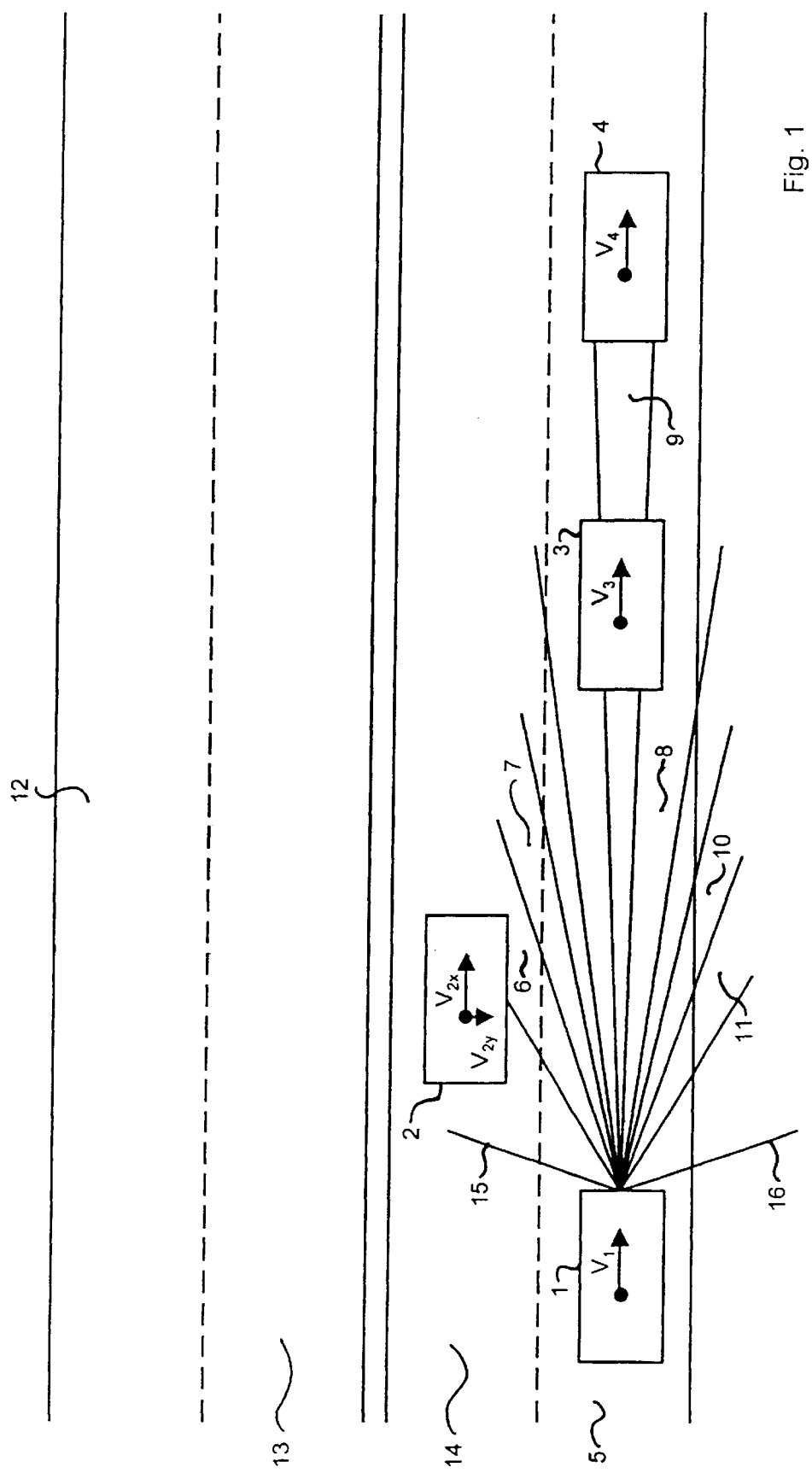
FIG. 1 is a schematic top view of a highway with vehicular traffic.

The same reference numbers are used for identical parts in the drawings.

FIG. 1 shows a highway with two lanes 5, 14 and 12, 13 in each direction of travel. Three vehicles 1, 3, 4 are shown in traffic lane 5, and one vehicle 2 is shown in traffic lane 14. Each of the vehicles 1, 2, 3, 4 moves at speeds $V_1$, $V_2$, $V_3$, $V_4$ respectively in the direction of the arrow shown for each vehicle. Vehicle 1 is the vehicle to be regulated and is equipped with a device for the automatic regulation of the distance to another vehicle. The distance regulation of vehicle 1 is effected relative to vehicle 3, which precedes vehicle 1 in traffic lane 5. The other vehicles 2 and 4 also shown serve to explain certain surrounding conditions for which the braking readiness signal is produced according to the invention in anticipation of a distance regulation action.

The vehicle 1 is equipped with a distance-sensing device in front, preferably in the form of a radar device, which emits distance-measuring rays in the direction of travel or within a given range of angles about the direction of travel. Conventional radar installations cover, e.g., the detection areas 6, 7, 8, 9, 10, 11 shown in FIG. 1. Objects which are located within these detection areas trigger reflections of the radar signal in the direction of the distance-sensing device of the vehicle 1.

Utilization of a radar device as the distance-detecting device is advantageous due to the fact that such a device also provides information on speed thanks to the Doppler effect, in addition to distance information and without any further signal processing measures such as, e.g., numerical differentiation and filtering. The cost of producing the signal processing measures to utilize the process according to the invention is therefore relatively low.

Furthermore, the vehicle 1 is equipped in front with an optical image capturing device, e.g., a video camera with which it is possible to evaluate optical information in the distance-regulating device installed in the vehicle 1. In this context, actuation of rear signal lights of preceding vehicles, such as, e.g., the turn signals and brake lights are understood to be optical information. The image-capturing device covers a relatively wide detection area as shown by the area delimited by the lines 15, 16.

Figure 2:
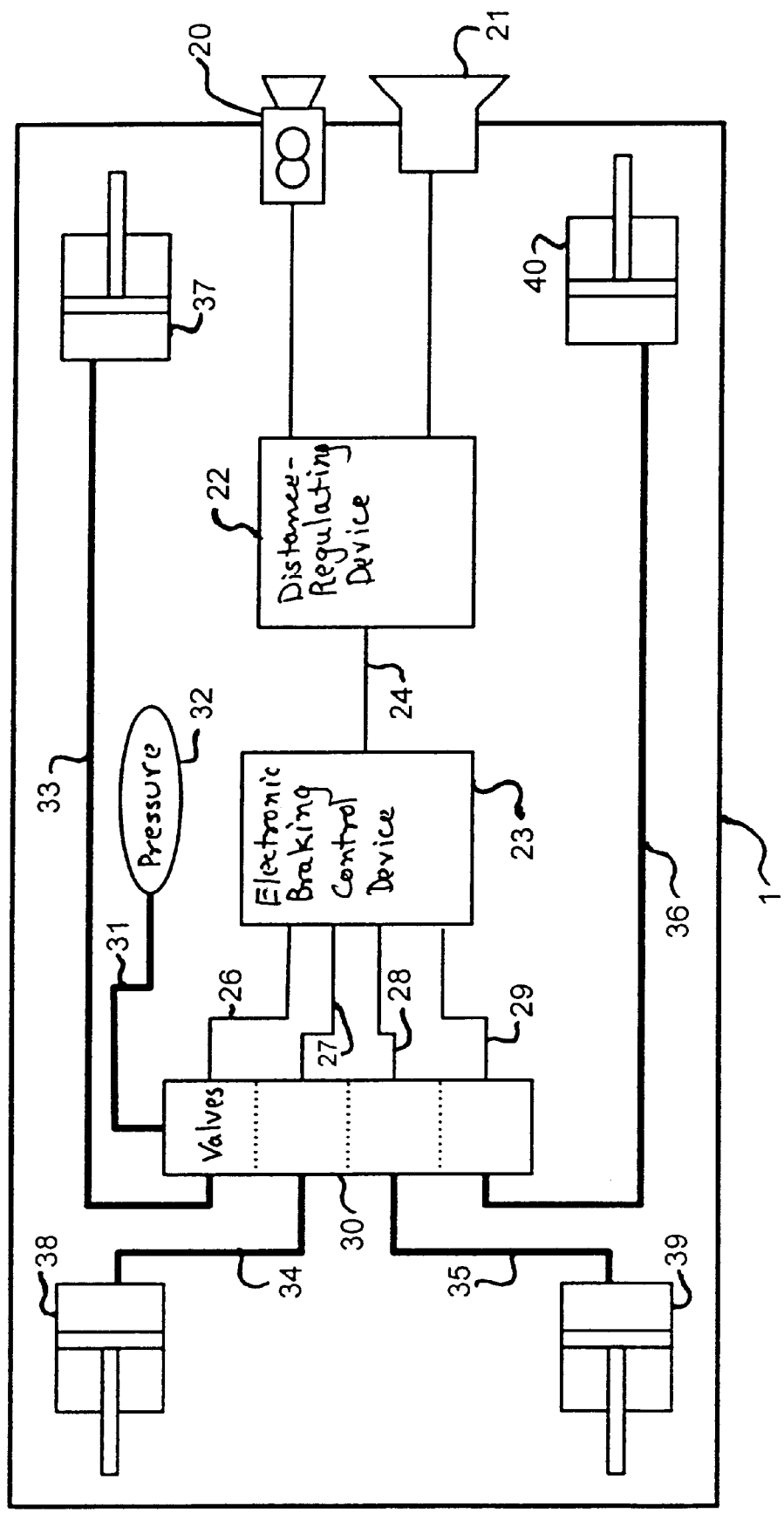
FIG. 2 is a schematic drawing of the components of a vehicle to be regulated according to the inventive process.

FIG. 2 shows the vehicle 1 in a schematic drawing together with the components which are relevant to the invention. The image-capturing device 20 and the distance-detecting device 21 are connected via electric signal lines to the distance-regulating device 22. The distance-regulating device 22 which is preferably made in the form of an electronic control device receives an image signal from the image-capturing device 20 as well as different distance and speed signals from the distance-detecting device 21 corresponding to the radar signals reflected in the capturing areas 6, 7, 8, 9, 10, 11. Through evaluation of these input signals in a control program, the distance-regulating device 22 calculates and observes, e.g., the distance to the vehicles 2, 3, 4 as well as their velocities $V_2$, $V_3$, $V_4$ in a manner familiar to the person schooled in the art. Within the framework of the control program, the process according to the invention is also executed by a set of sub-programs as will be described below.

Furthermore, the vehicle has a braking system, preferably of an electrically controlled kind, comprising an electronic braking control device 23, a valve system 30 connected via electric signal lines 26, 27, 28, 29 to the braking control device 23, a pressure medium reservoir 32 connected via a pressure medium line 31 to the valve system 30, and pressure-medium actuated brake cylinders 37, 38, 39, 40 which are in turn connected to the valve system 30. The brake cylinders 37, 38, 39, 40 are furthermore connected in a known manner to mechanically actuated friction brakes. For the sake of clarity, the friction brakes are not explicitly shown in FIG. 2. The braking control device 23 controls the friction brakes in response to a braking command of the driver that is-produced by a brake signal transmitter, e.g., a brake pedal (not shown in FIG. 2), by supplying pressure medium from the pressure medium container 32 into the brake cylinders 37, 38, 39, 40 by means of suitable actuating signals for the valve system 30

The electronic braking control device 23 is furthermore connected via a data bus 24 to the distance-regulating device 22. When needed, the distance-regulating device 22 sends the brake readiness signal or a braking command or other signals via the data bus 24 to the braking control device 23. Due to the signals received via the data line 24, the braking control device 23 actuates the valve system 30 in such manner that the brake action demanded by the distance-regulating device 22 is obtained. When the brake readiness signal is received, the brake readiness state is assumed and this means in the present embodiment that the braking control device 23 injects the so-called "application pressure" into the brake cylinders 37, 38, 39, 40, causing the venting clearance of the brakes to be overcome, and the brake linings to be pressed lightly against the brake disk or brake drum without any significant braking action occurring.

Figure 3:
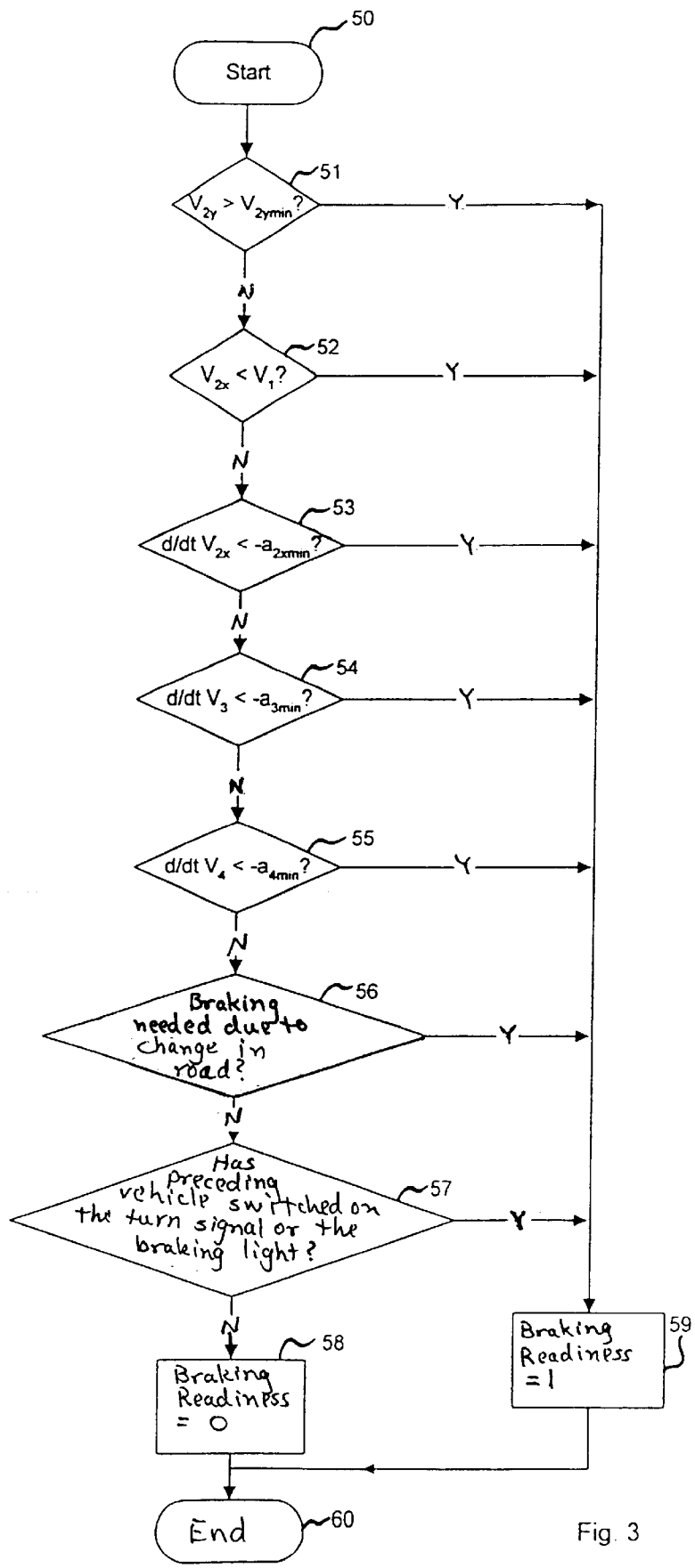
FIGS. 3 and 4 are flow charts for carrying out a preferred embodiment of the invention.

A preferred embodiment of the production of the brake readiness signal for the situation illustrated in FIG. 1 is explained below through the flow chart of FIG. 3. The process according to FIG. 3 starts with block 50 and is a part of the control program executed in the distance-regulating device 22.

The program verifies in a decision block 51 whether the vehicle 2 in the adjoining traffic lane 14 is moving with a certain marked tendency in the direction of the lane 5 of the vehicle 1 to be regulated. The moving tendency is found by comparing the velocity component $V_{2y}$ with a minimum threshold value $V_{2ymin}$. If the velocity component $V_{2y}$ exceeds the minimum velocity value $V_{2ymin}$, this is considered to be a sign for a possible swerving of the vehicle 2 into the lane 5 and the program continues to process block 59 in which a Boolean variable "Braking Readiness" is set to value 1.

Otherwise, the program continues with another decision block 52 in which a verification is made whether the vehicle 2 travels at a slower speed than the vehicle 1 to be regulated. For this, the velocity component $V_{2x}$ is compared with the velocity $V_1$. If the velocity component $V_{2x}$ of vehicle 2 is lower than the velocity $V_1$ of the vehicle 1 to be regulated, the program also branches off to the previously mentioned processing block 59.

Otherwise, the program continues with another decision block 53. There verification is made whether the vehicle 2 is decelerating. The deceleration of a vehicle in a passing lane often points to very dense or halting traffic, so that the need for braking may occur shortly. For this reason the program branches off to the decision block 59 if the slowing $dV_{2x}/dt$ of vehicle 2 drops below a minimum deceleration value $-a_{2xmin}$.

Otherwise, the program continues with another decision block 54 where verification is made whether the vehicle 3 is decelerating slightly. For this the deceleration $dV_3/dt$ of the vehicle 3 is compared with a minimum deceleration value $-a_{3min}$ that has a relatively low numerical value and if this value is not reached the program branches off to the processing block 59.

Otherwise, the program continues with another decision block 55 in which verification is made whether the vehicle 4 is decelerating. For this the deceleration $dV_4/dt$ of vehicle 4 is compared with a minimum deceleration value $-a_{4min}$ to be used for this purpose, in a similar manner as in blocks 53, 54, and if that value is not reached, the program branches off to the processing block 59.

Otherwise, the program continues with another decision block 56. There, verification is made whether for reason of changes in the road (e.g., an approaching tight curve) which is determined by means of a GPS receiver, preferably installed in the distance-regulating device 22, and a digital road map, preferably stored in the distance-regulating device 22, a need for brake action can be expected shortly. If this is the case, the program also branches off to the processing block 59, else it continues with a decision block 57. There verification is made through evaluation of the signal of the image-capturing device whether a lane change of the vehicle 2 traveling in an adjoining traffic lane can be expected based on a turn signal of the directional signal of that vehicle. A further verification is made whether a braking light of the preceding vehicle 3 points to an imminent deceleration and therefore to a need for braking. If at least one of the above mentioned conditions is met, the program also branches off to the processing block 59, else it continues with the processing block 58 in which the Boolean variable "Braking Readiness" is set to the value 0. The program then ends with block 60.

Figure 4:
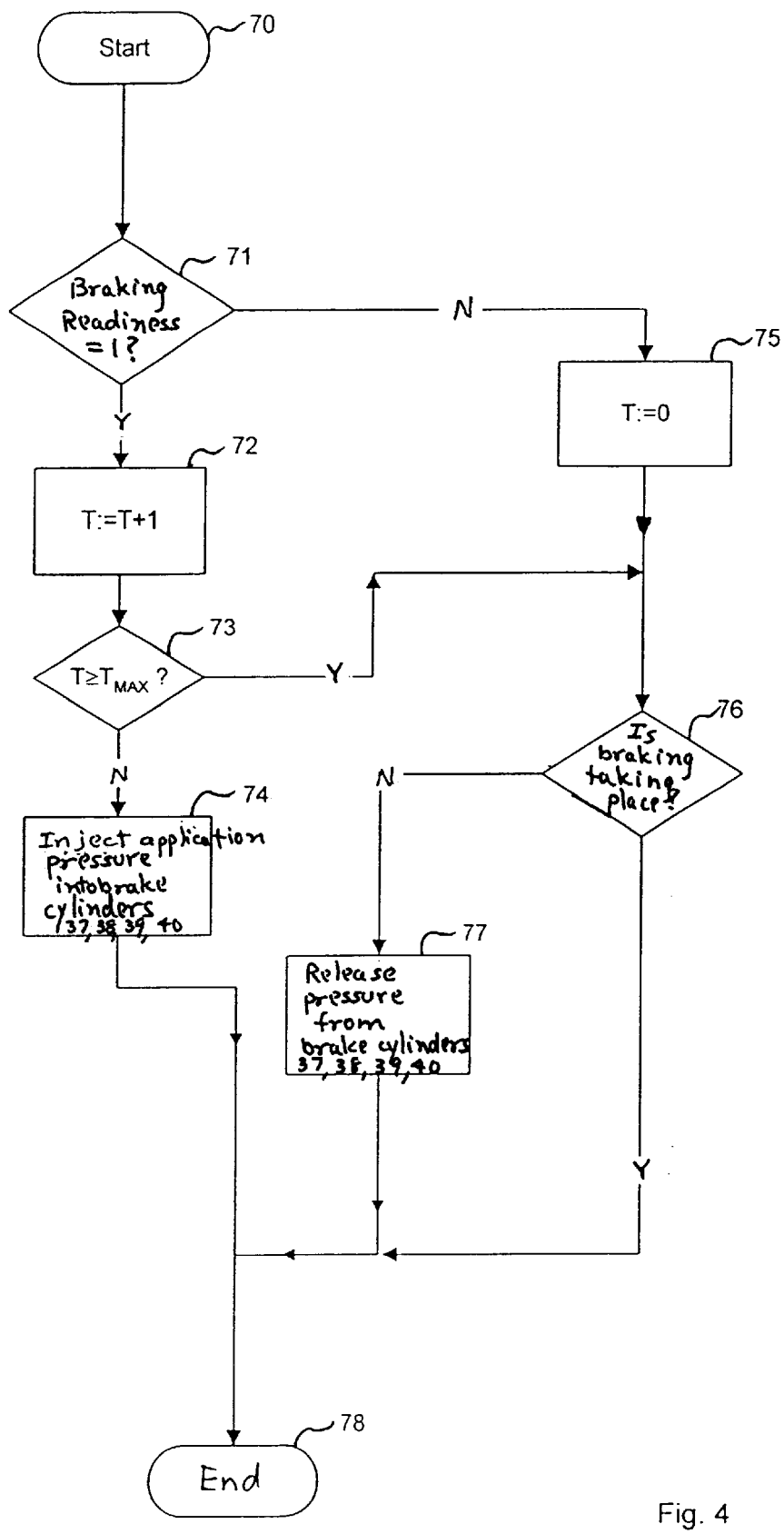

FIG. 4 shows a preferred embodiment of the evaluation of the braking readiness signal. The process according to FIG. 4 starts with block 70.

A verification is made in decision block 71 whether the Boolean variable "Braking Readiness" has been set to the value 1. If this is the case, the program branches off to a block 72 in which a timer T that has been initialized to the value zero after switching on the distance-regulating device 22 is incremented. The timer T serves to monitor the time during which the braking readiness state is assumed as a result of the variable "Braking Readiness" set to zero and during which the venting clearance of the brake is overcome. A verification is made in a following decision block 73 whether the timer T has reached or exceeded a maximum time span $T_{MAX}$ for the braking readiness state admissible to avoid unnecessary wear or overheating of the brake linings. If this is the case, the program branches off to the decision block 76 which shall be discussed in further detail below. Otherwise, the program continues with block 74 in which suitable actuation signals for the injection of the application pressure into the brake cylinders 37, 38, 39, 40 are transmitted to the valve system 30. The braking system is then in the braking readiness state. The process then ends with block 78.

However, if the variable "Braking Readiness" does not have the value 1, the program first branches off to a decision block 75 in which the timer T is reset to a starting value zero.

The program then continues with the further decision block 76. In this block, a verification is made whether the vehicle 1 is actually being braked, e.g., through pedal actuation by the driver. If no pedal actuation has taken place, the program branches off to a block 77 in which the pressure medium is released from the brake cylinders 37, 38, 39, 40. This is to avoid maintaining the application pressure injected in block 74 at the end of the braking readiness state, which could result in unnecessary wear or overheating of the brake linings.

The process then ends with block 78.

While the invention has been described with reference to specific embodiments, this was for purposes of illustration only, and should not be construed to limit the spirit or the scope of the invention.

What is claimed is:

1. A process for automatically regulating the distance between a vehicle to be regulated and another vehicle, wherein the vehicle to be regulated includes a distance-regulating device and a braking system, the braking system including a braking control device and brakes, the braking system being actuable to apply the brakes by the distance-regulating device when the distance-regulating device transmits a brake actuation signal to the braking system, said process comprising, prior to transmitting said brake actuation signal, said distance-regulating device transmitting a braking readiness signal to said braking control device, and said braking control device causing said braking system to assume a braking readiness state upon receiving said braking readiness signal.

2. Process as in claim 1, wherein the brakes comprise friction brakes which are actuated in the braking readiness state in such manner that their venting clearance is overcome.

3. Process as in claim 1, wherein the braking system comprises pressure-medium-actuated brake cylinders into which an application pressure is injected in the braking readiness state.

4. Process as in claim 1, wherein the distance-regulating device transmits the braking readiness signal to the braking system when braking is expected to occur shortly based on the travel and road conditions surrounding the vehicle to be regulated.

5. Process as in claim 1 wherein the distance-regulating device transmits the braking readiness signal to the braking system when a vehicle traveling ahead at a short distance in an adjoining traffic lane is expected to change its direction of travel shortly to the lane of the vehicle to be regulated.

6. Process as in claim 1 further comprising terminating the braking readiness state after a predetermined period of time.

* * * * *